United States Patent
Totale et al.

(10) Patent No.: US 11,842,183 B2
(45) Date of Patent: *Dec. 12, 2023

(54) METHODS AND SYSTEMS FOR PACKAGING AND DEPLOYMENT OF APPLICATIONS IN A MULTITENANT PLATFORM

(71) Applicant: Open Text Corporation, Waterloo (CA)

(72) Inventors: Sachin Gopaldas Totale, Pleasanton, CA (US); Chaithanya Lekkalapudi, Redwood City, CA (US); Pawel Tomasz Zieminski, Pleasanton, CA (US); Ravikumar Meenakshisundaram, Pleasanton, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,638

(22) Filed: Oct. 21, 2022

(65) Prior Publication Data
US 2023/0053942 A1 Feb. 23, 2023

Related U.S. Application Data

(63) Continuation of application No. 17/083,202, filed on Oct. 28, 2020, now Pat. No. 11,507,363, which is a
(Continued)

(51) Int. Cl.
*G06F 8/65* (2018.01)
*H04L 67/00* (2022.01)
(Continued)

(52) U.S. Cl.
CPC ............... *G06F 8/65* (2013.01); *G06F 8/433* (2013.01); *G06F 8/71* (2013.01); *H04L 67/34* (2013.01)

(58) Field of Classification Search
CPC ... G06F 8/65; G06F 8/433; G06F 8/71; H04L 67/34
(Continued)

(56) References Cited

U.S. PATENT DOCUMENTS

| 11,507,363 B2 | 11/2022 | Totale et al. |
| 2016/0011867 A1 | 1/2016 | Weissman |
| 2020/0065086 A1* | 2/2020 | Woodmansee ........ G06F 9/5072 |

OTHER PUBLICATIONS

Moens et al, "Feature-Based Application Development and Management of Multi-Tenant Applications in Clouds", 2015, [Online], pp. 72-81, [Retrieved from Internet on Jul. 10, 2023], <chrome-extension://efaidnbmnnnibpcajpcglclefindmkaj/https://dl.acm.org/doi/pdf/10.1145/2648511.2648519> (Year: 2014).*

(Continued)

*Primary Examiner* — S. Sough
*Assistant Examiner* — Zengpu Wei
(74) *Attorney, Agent, or Firm* — Sprinkle IP Law Group (57) ABSTRACT

Systems, methods and computer program products for providing a multi-tenant application execution environment that provides an object metadata service for managing application configuration in the multi-tenant environment. In one embodiment, a system has an application manager, a bundle manager, and a deployment manager. The application manager captures application metadata for a corresponding version of an application and defines a corresponding bundle which contains metadata that configures the version of the application. The bundle manager validates each bundle and stores the validated bundle in a bundle library in a data storage device. The deployment manager retrieves a master schema and one or more of the bundles from the bundle
(Continued)

library and installs the retrieved master schema and the retrieved bundles, generating a tenant schema which is accessible by a corresponding tenant of the multi-tenant environment that has subscribed to the version of the application.

15 Claims, 6 Drawing Sheets

Related U.S. Application Data continuation of application No. 16/273,742, filed on Feb. 12, 2019, now Pat. No. 10,871,956.

(51) Int. Cl.
*G06F 8/41* (2018.01)
*G06F 8/71* (2018.01)

(58) Field of Classification Search
USPC .......................................................... 717/168
See application file for complete search history.

(56) References Cited

OTHER PUBLICATIONS

European Search Report issued by the European Patent Office (EPO) for European Patent Application No. 20755859.4, dated Oct. 19, 2022, 8 pages.

\* cited by examiner

METHODS AND SYSTEMS FOR PACKAGING AND DEPLOYMENT OF APPLICATIONS IN A MULTITENANT PLATFORM

CROSS REFERENCE TO RELATED APPLICATIONS

This application is a continuation of, and claims a benefit of priority under 35 U.S.C. 120 from, U.S. patent application Ser. No. 17/083,202, filed Oct. 28, 2020, issued as U.S. Pat. No. 11,507,363, entitled "METHODS AND SYSTEMS FOR PACKAGING AND DEPLOYMENT OF APPLICATIONS IN A MULTITENANT PLATFORM," which is a continuation of, and claims a benefit of priority under 35 U.S.C. 120 from, U.S. patent application Ser. No. 16/273,742, filed Feb. 12, 2019, issued as U.S. Pat. No. 10,871,956, entitled "METHODS AND SYSTEMS FOR PACKAGING AND DEPLOYMENT OF APPLICATIONS IN A MULTITENANT PLATFORM," both of which are hereby fully incorporated herein by reference for all purposes.

TECHNICAL FIELD

This disclosure relates generally to the field of metadata management in the packaging and distribution of applications in multitenant application environments.

BACKGROUND OF THE RELATED ART

Conventionally, users of specialized applications have run their custom code on their own premises. In the case of on-premise applications, an application is installed on a computer system on the customer's premises and an entire table structure for the application is typically created. Since the customer is the only tenant of the system, other computing systems that are external to the users' premises have not been affected by the computing operations performed by the users, and there is no need to provide any means to prevent one tenant from affecting another's use of resources, or to prevent other tenants from accessing the customer's data.

Implementing the application and providing the same services in a multitenant environment (e.g., in a cloud-based environment), however, becomes more challenging. In this environment, there are multiple tenants that may subscribe to different applications/versions, and may implement their own customized object definitions, rules, and the like, so it is necessary to manage the applications and the users' customizations in a way that is efficient and maintains the separation of the different tenants' domains within the multitenant environment. Thus, it has become necessary to implement mechanisms to enable different users to access common applications while allowing the users to customize the applications as needed to meet their own requirements.

SUMMARY OF THE DISCLOSURE

In multi-tenant systems, applications can be used by various different users (tenants). A multi-tenant platform can, for example, host a loan processing application, a digital asset management application, an employee records management application, or an image transformation application. The different applications can be hosted on a single platform that allows each tenant to subscribe to one or more of the applications and to use the applications within the domain that is associated with that particular tenant. While the different tenants may be using the same application, the application appears to each tenant as if the tenant is the only one using the application. Each tenant may itself have multiple users who access the application.

Because different tenants have different needs, the applications may be customized by each of the tenants. This allows each tenant to define its own data model or schema in connection with the application. The data model may define various objects, business rules, permissions, and various other structures that are implemented by the application to achieve the desired customization, as well as metadata for the defined objects. The data model for a tenant may be very simple, possibly using only a single object, or it may be a very complex structure that involves many different objects and business process rules. Each tenant's data model, although implemented by a common application, is applied only with respect to that tenant, so the customizations and data of one tenant will not affect other tenants in the multitenant environment.

Because of the different applications and data models that may be used by tenants in a multitenant environment, it is important to be able to manage the different applications and data models that are associated with the different tenants.

Embodiments disclosed herein can address the drawbacks of prior art systems and methods for and provide additional technical solutions and benefits. One exemplary embodiment of the invention provides an object metadata service in a multitenant application platform. In this embodiment, metadata associated with specific applications are stored in metadata bundles, and the bundles are stored in libraries. Metadata bundles may also store metadata for specific versions of the applications. When a tenant subscribes to an application, the system verifies the tenant's subscription, retrieves the metadata bundles associated with the subscribed applications and/or versions, and deploys the subscribed applications and/or versions in the tenant's domain on the platform. In this embodiment, tenant-specific data that defines a data model of the specific tenant is separately stored. The deployment of the applications and/or versions may be installations of the full applications, or upgrades of applications from one version to another. Embodiments disclosed herein provide new systems, methods, and computer program products for providing the object metadata service.

One exemplary embodiment comprises a system for providing a multi-tenant application execution environment. The system includes one or more servers that are communicatively connected to one or more data storage devices to implement an object metadata service for managing application configuration in the multi-tenant environment. The system has an application manager, a bundle manager, and a deployment manager running on the on the one or more servers. The application manager captures application metadata for a corresponding version of an application and defines a corresponding bundle which contains metadata that configures the version of the application. The bundle manager, responsive to the application manager, validates each bundle and stores the validated bundle in a bundle library in one or more data storage devices. The deployment manager, responsive to the application manager, retrieves a master schema and one or more of the bundles from the bundle library and installs the retrieved master schema and the retrieved bundles, generating a tenant schema corresponding to the retrieved master schema and the retrieved bundles. The tenant schema is accessible by a corresponding tenant of the multi-tenant environment that has subscribed to the version of the application.

In one embodiment, the application manager receives application information including application metadata from a management system that is communicatively connected to the application manager and defines each of the bundles based on the application metadata. The application manager in this embodiment maintains an inventory of tenant subscriptions, each of which identifies a corresponding version of the application. Different tenant subscriptions are capable of identifying different versions of the application. Different versions of the application are associated with different ones of the validated bundles stored in the bundle library.

Each bundle may contain a descriptor artifact that describes operations for deploying the corresponding version of the application and one or more metadata payload artifacts that define a configuration of the corresponding version of the application. The descriptor artifact and metadata payload artifacts may comprise JSON files that are stored in a hierarchical folder structure. Each bundle may comprise a compressed data structure. The descriptor artifact may contain an ordered list of deployment operation entries, where each deployment operation entry includes an action, an artifact type and an operation payload. The artifact types may include one or more of the group consisting of: namespaces; categories; validation definitions; trait definitions; type definitions; event handlers; and master data. Upon deployment, the deployment operation entries are executed in one embodiment in the order: namespaces; then categories; then validation definitions; then trait definitions; then type definitions; then event handlers; then master data.

The application metadata bundle captured for the corresponding version of the application may define one or more dependencies on one or more additional application metadata bundles. The deployment manager may be configured to deploy the version of the application by deploying the one or more additional application metadata bundles according to a dependency graph defined in the first application metadata bundle prior to deploying the application metadata of the first application metadata bundle.

One alternative embodiment comprises a method including performing the functions of the system as described above. Another embodiment comprises a computer program product having a non-transitory computer-readable storage medium that stores computer instructions translatable by a processor to perform the functions described above. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 1 depicts a diagrammatic representation of an exemplary multitenant application system according to some embodiments.

FIG. 2 depicts a diagrammatic representation of an exemplary structure of the application management system according to some embodiments.

FIG. 3 depicts a flow diagram that illustrates steps in the lifecycle of a metadata bundle according to some embodiments.

FIG. 4 depicts a flow diagram that illustrates steps in the lifecycle of a metadata bundle according to some embodiments.

FIG. 5 depicts a diagrammatic representation of an exemplary structure of an incremental bundle structure according to some embodiments.

FIG. 6 depicts a flow chart illustrating an example of a method for processing a tenant request according to some embodiments.

FIG. 7 depicts a flow chart illustrating an example of a method for processing tenant input information according to some embodiments.

FIG. 8 depicts a diagrammatic representation of a distributed network computing environment where embodiments disclosed can be implemented.

FIG. 9 depicts a diagrammatic representation of a distributed network computing environment where embodiments disclosed can be implemented.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments of the present invention are intended to be implemented in a multitenancy environment in a cloud-based platform. This platform may be used to execute applications that can provide Enterprise Information Management (EIM) services (e.g., content management services). The system provides tenants with access to services, including storage, security and data models, using common resources.

This platform implements a microservices architecture. One of the microservices is a management service that is responsible for managing such things as tenants of the system, lists of applications that are available on the system, and tenants' subscriptions to the applications. Another one of the core microservices, and potentially one of the most important, is an object metadata service. The object metadata service provides capability for a tenant's application teams to separately define their own data models for the applications. This includes defining business rules for the data models, as well as permissions associated with the data models.

The object metadata service organizes and manages metadata for applications that are used by the tenants of the multitenant platform. Each application has two parts: executable code, which is shared and is used by all of the tenants; and a data model, which may be different for each tenant, and must be separately installed for each tenant. The data model is stored in a metadata bundle that contains the definitions, rules and other artifacts that affect the runtime behavior of the application.

Each metadata bundle contains a deployment descriptor and a set of metadata artifacts that are associated with a particular application (and/or revision) and a master data model. The metadata bundles include such information as artifact definitions, master data, and the version of the application with which the bundle is associated. The tenants' data models may be separately stored and are applicable to the tenant when it subscribes to the application. This allows each tenant to customize the application to its own needs, so that the application behaves in a manner which is substantially the same as an on-premises installation of a custom application, even though the application is implemented in a very different way in the multitenant environment.

Figure 1:
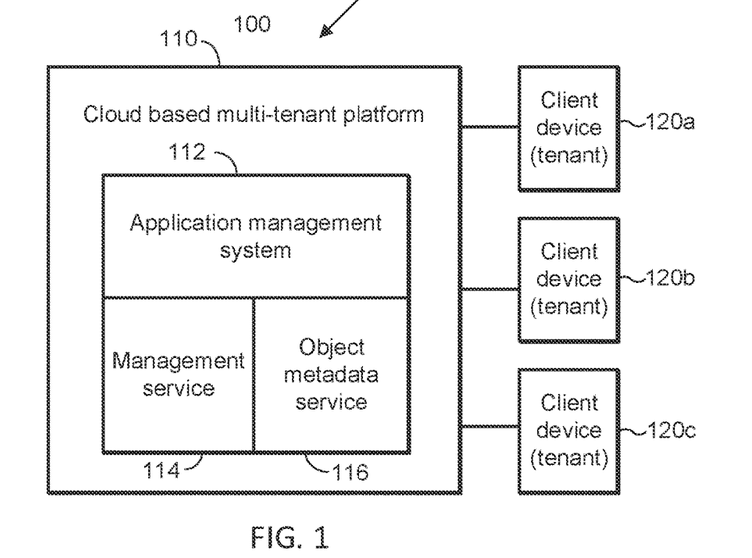

The present systems and methods may be implemented in a systems having a variety of structures. FIG. 1 depicts a diagrammatic representation of an exemplary system in accordance with some embodiments. In this example, the system 100 includes a cloud-based platform 110 that is accessible by client devices 120. Cloud-based platform 110 executes one or more applications, each of which may have one or more versions. Platform 110 provides a multi-tenant environment in which tenants that have subscribed to one or more of the applications may access the applications using the client devices 120. Preferably, though not necessarily, the tenants' respective interactions with the applications are transparent to other tenants, so that it appears to each tenant that there are no other tenants using the applications. Client devices 120 may, for example, use Representational State Transfer (REST) application program interfaces (APIs) to request that operations be performed.

Cloud-based platform 110 has a, application management system 112 that manages the different applications that are available to tenants on the platform. Tenants register with a management service 114 that controls their access to the applications on the platform. Management service 114 provides an interface to manage the Installation, Deployment and Upgrade of applications. Management service 114 may perform functions such as creating new tenants, authenticating tenants, maintaining tenant subscription records, and so on. Management service 114 interacts with an object metadata service 116 to install and upgrade appropriate versions of the available applications for each of the registered tenants. Object metadata service 116 maintains the information for each application and version in metadata bundles that are stored in a library, where they can be accessed as needed to install or upgrade the applications for the tenants.

It should be noted that some of the reference numbers used in the drawings include lowercase letters (e.g., 120a, 120b, etc.) For the purposes of this disclosure, citations to a reference number without a lowercase letter is intended to include any or all of the items that are indicated in the drawings by the reference number with a lowercase letter. Citations in the text to a reference number with a lowercase letter are intended to refer to the specific item in the drawings indicated by that specific reference number and lowercase letter.

The tenants of the platform can control their respective installations of the applications, adding users, defining domain objects associated with the application, and so on. Multiple entities may be involved with the different applications and the domain objects associated with the applications. For instance, in the example of a loan processing application, domain objects (e.g., loan applications) and metadata (e.g., attributes such as type of loan, amount of loan, interest rate, etc.) may be defined by users (e.g., banks). In some cases, these users may define their own custom code (instructions, scripts or other executable programming that may be used to define the behavior of domain objects). The system may provide controlled access to tenant databases, as well as providing isolation to the executing scripts, thus providing protection from the executing scripts (for other tenants, as well as for the host system). This may include applying policies, permissions, etc. to the scripts to control their access to the tenant database.

The metadata associated with the applications is managed by the system's object metadata microservice. This metadata may provide the application with capabilities such as business domain specific entity/type definitions, business domain specific permission modeling, business domain specific metadata structuring (e.g., case modeling or relationship modeling), and generic operations based on type categories. The generic operations may include operations for, e.g., file object types, folder object types, business object types, and relation types.

Figure 2:
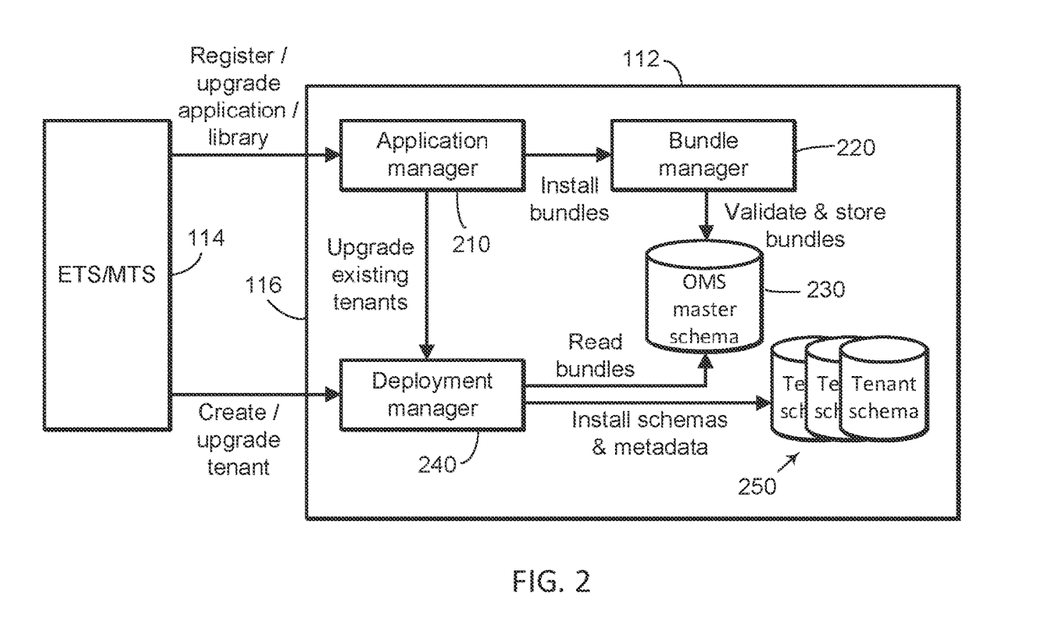

Referring to FIG. 2, a diagrammatic representation of an exemplary structure of the application management system in accordance with some embodiments is depicted. As shown in FIG. 1, application management system 112 includes management service 114 and object metadata service 116. Object metadata service 116 includes an application manager 210, a bundle manager 220, a data storage 230 for the object metadata service master schema and application metadata bundles, a deployment manager 240 and a tenant schema storage 250.

Figure 3:
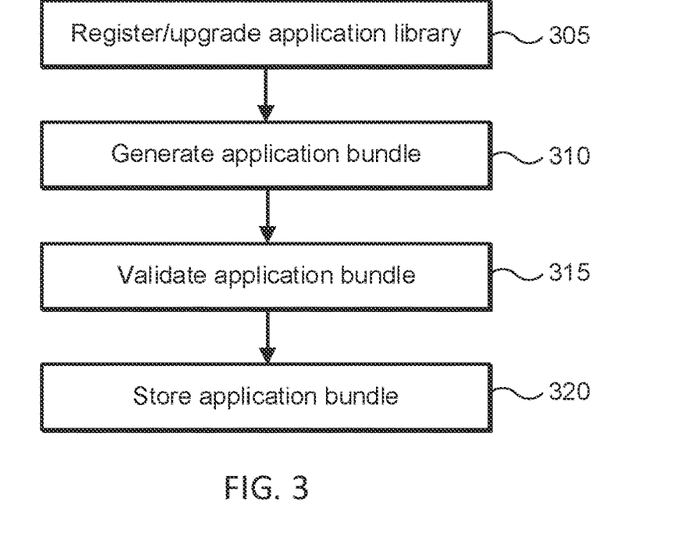
Figure 4:
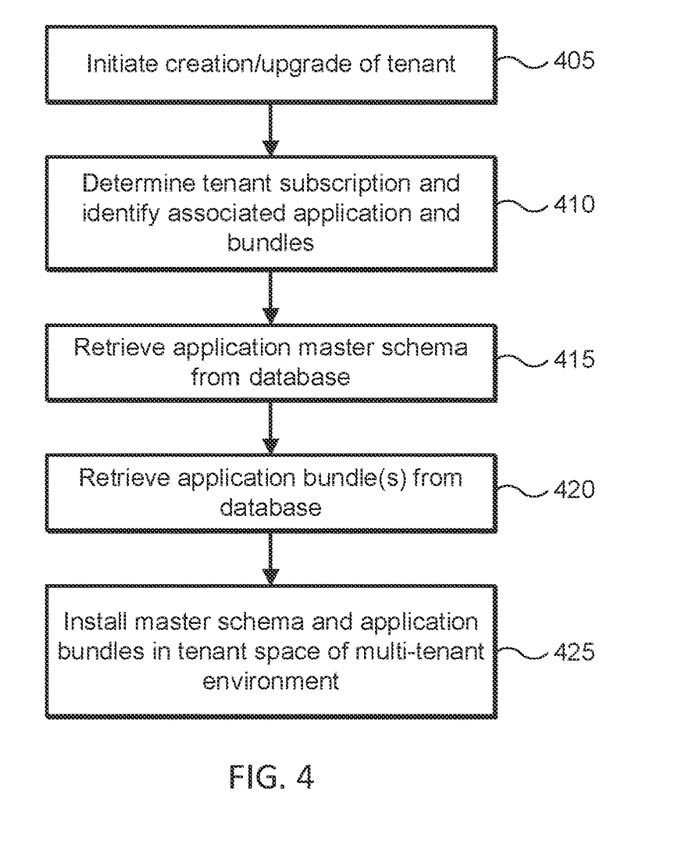

FIG. 2 illustrates the lifecycle of a metadata bundle, as well as the structure of the application management system. FIGS. 3 and 4 are flow diagrams that illustrate steps in the lifecycle of a metadata bundle in this embodiment.

When an application team builds an application, the application is registered with the system. Management service 114 adds the application to a list of applications that are registered with the system and forwards the application to application manager 210. Application manager 210 registers the application in an application library or upgrades the registration, if the application is an upgrade to an application that was previously registered (305). Application manager 210 communicates with bundle manager 220, which then generates a metadata bundle for the application (310). The structure of the application metadata bundle will be discussed in more detail below. The generated metadata bundle is then validated (315) by bundle manager 220 and is stored by the bundle manager in a library (e.g., a database) in storage 230 (320). The application metadata bundle is then available for retrieval and installation for use by a tenant.

Referring to FIGS. 2 and 4, the installation and/or upgrade of an application for a tenant is illustrated. Management service 114 is responsible for managing tenants on the system. A user that wishes to install or upgrade an application communicates with management service 114, which initiates the creation of a new tenant for a new installation of an application, or initiates an upgrade if the tenant is already registered with the system (405). Management service 114 then determines the details of the tenant's subscription and identifies the associated application(s) and metadata bundles (410). This information is provided to application manager 210 and deployment manager 240, which retrieve the master schema and identified application metadata bundles from storage 230 (415, 420). The master schema and identified application metadata bundles are then deployed in a tenant space in the multitenant environment (425).

Applications evolve over time, such as by adding new features or changing the way existing features work. Application evolution can be manifested in embodiments of the present system by adding new application bundles, where the application bundles capture the changes that need to be applied as part of instantiating a new instance of an application or upgrading an existing instance of an application for a tenant. At a high level, the system provides two ways of managing application bundles: incrementally, where the changes are contained in multiple bundles; or collectively, where the changes are aggregated into a single bundle.

With Incremental application bundles, a first application bundle is associated with the first version of the application, and additional bundles contain incremental changes that are applied in succession to the older version of the application. Each version of the application will have one more bundles associated with it, encapsulating the changes associated with newer version of the application.

The application bundle definition can also declare dependencies that it has with other applications. A dependency declaration makes sure that application bundles which are associated with the dependent applications are deployed to the target tenant before the current application bundle is installed. The application dependencies can be defined in the bundle as shown in the example below, which declares the dependency of the current application on application "app 2" and application "app 1". The application deployment orchestrator therefore makes sure that bundles associated with "app 2" and application "app 1" are installed before deploying the current bundle.

```
"dependsOn" : [
  {
    "applicationName": "app 2"
  },
```

Figure 5:
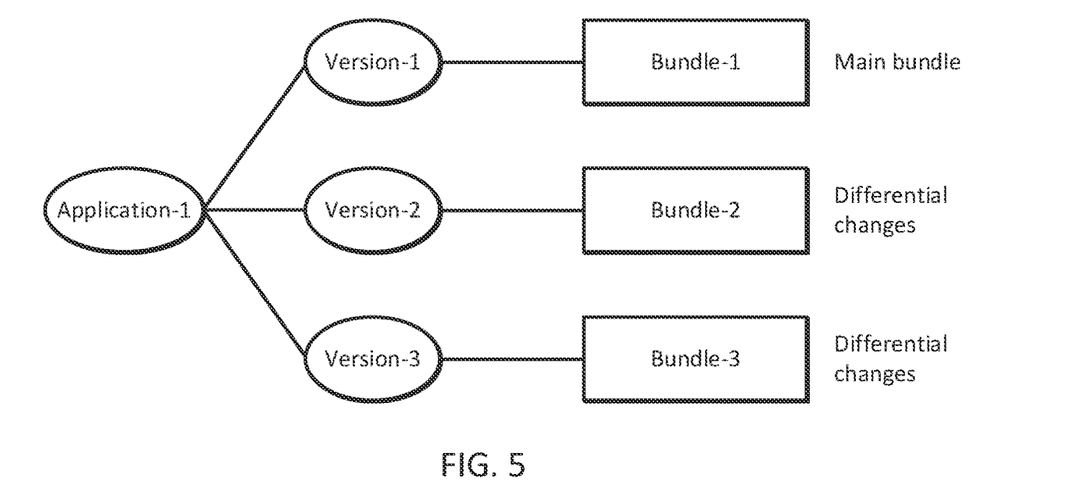

An exemplary structure of an incremental bundle structure is as shown in FIG. 5. It can be seen in the figure that an application has three versions: Version-1, which corresponds to the main application; Version-2, which makes differential changes to Version-1; and Version-3, which makes differential changes to Version-2. Each of the versions has a corresponding bundle (Bundle-1, Bundle-2 and Bundle-3, respectively). Bundle-1 contains the metadata for the main application, Bundle-2 contains differential changes to Bundle-1, and Bundle-3 contains differential changes to Bundle-2. When the current version of Application-1 is deployed, it includes deployment of Bundle-1, then Bundle-2, and then Bundle-3.

Figure 6:
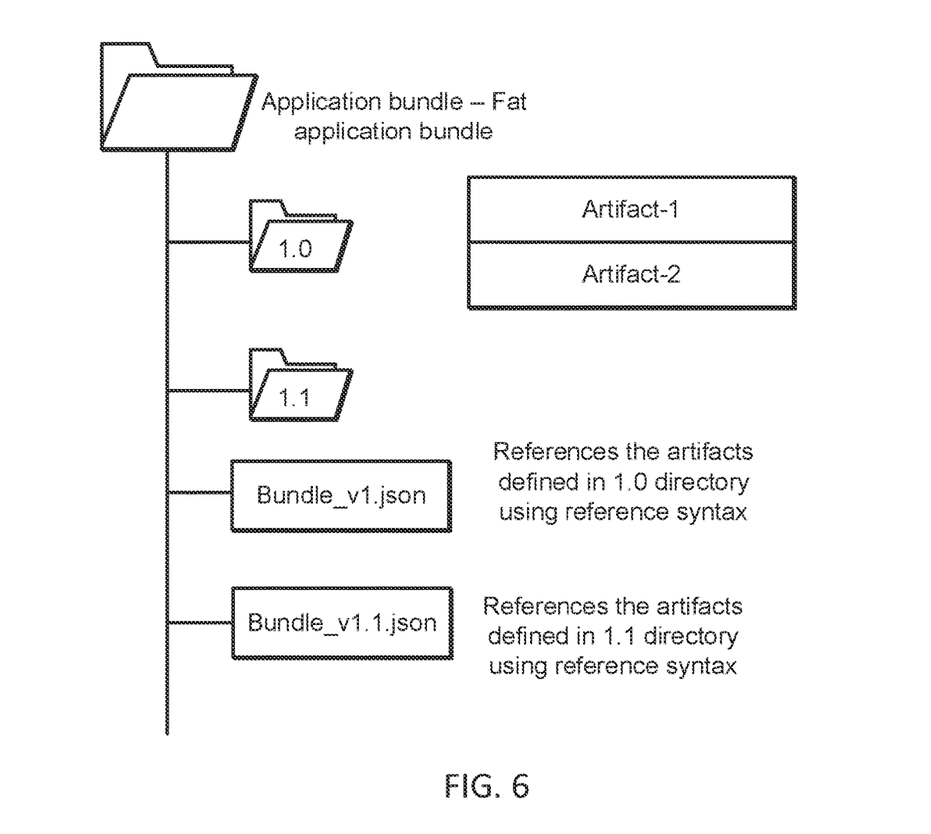

Collective application bundles, which may also be referred to herein as Fat application bundles, include the changes associated with new versions of the application, along with initial changes, in one bundle. The same bundle can be updated with the changes by adding new bundle descriptors to the same bundle archive, which is typically a zip file. In this case, the system may be required to take the responsibility of extracting the differential changes to an existing version of the bundle, and installing this into the context of the application. Fat bundles provide a simpler way to manage all the changes pertaining to the application in a single archive, in comparison to Incremental bundles. The Fat bundles may therefore make it easier to track the changes in the application. As part of updating the bundle with the latest version, the system may validates all the bundle descriptors. This may be accomplished by computing the checksums on all of the bundle descriptors and, if the checksums are not valid (e.g., if the old bundle descriptors are changed accidentally for any reason), the updated bundle can be rejected to preserve the integrity of the bundle. An exemplary structure of a fat bundle is as shown in FIG. 6.

In case of development, instantiation of an application in a tenant sandbox (isolated tenant space) is a two-step process of installation and deployment. Installation involves installing the bundle so the bundle is available for deployment to tenants. In the context of a sandbox tenant, once a bundle is successfully installed, it can be deployed using the REST API's listed in Table 1 below. A tenant Admin token may need to be used to successfully install and deploy the tenant in development mode.

TABLE 1

| API | URL | Http Method | Payload | Description |
| --- | --- | --- | --- | --- |
| Installation of application bundle | /bundles | POST | Application bundle definition as zip or JSON file | This will install the bundle in device mode in the context of tenant |
| Deployment of application bundle | /bundles/ {bundleId}/ deployments | POST | — | The deploy the Installed application bundle in the context of tenant |
| Tenant reinstantiation | /testtenant | PUST | { "id":{id of the tenant that need to be re instantiated} } | Re initialize/ cleanup a tenant |

-continued

```
  {
    "applicationName": "app 1"
  }
```

Application development typically happens in an iterative mode. In order to do a clean deployment of the latest snapshot of a bundle to the sandbox tenant, the tenant reinstantiation API of Table 1 can be used. This will clean the tenant's old installation and deployments and will enable the latest snapshot of the bundle to be deployed. This will erase all the test data including custom types, traits and other data that has been instantiated in the context of the tenant.

Figure 7:
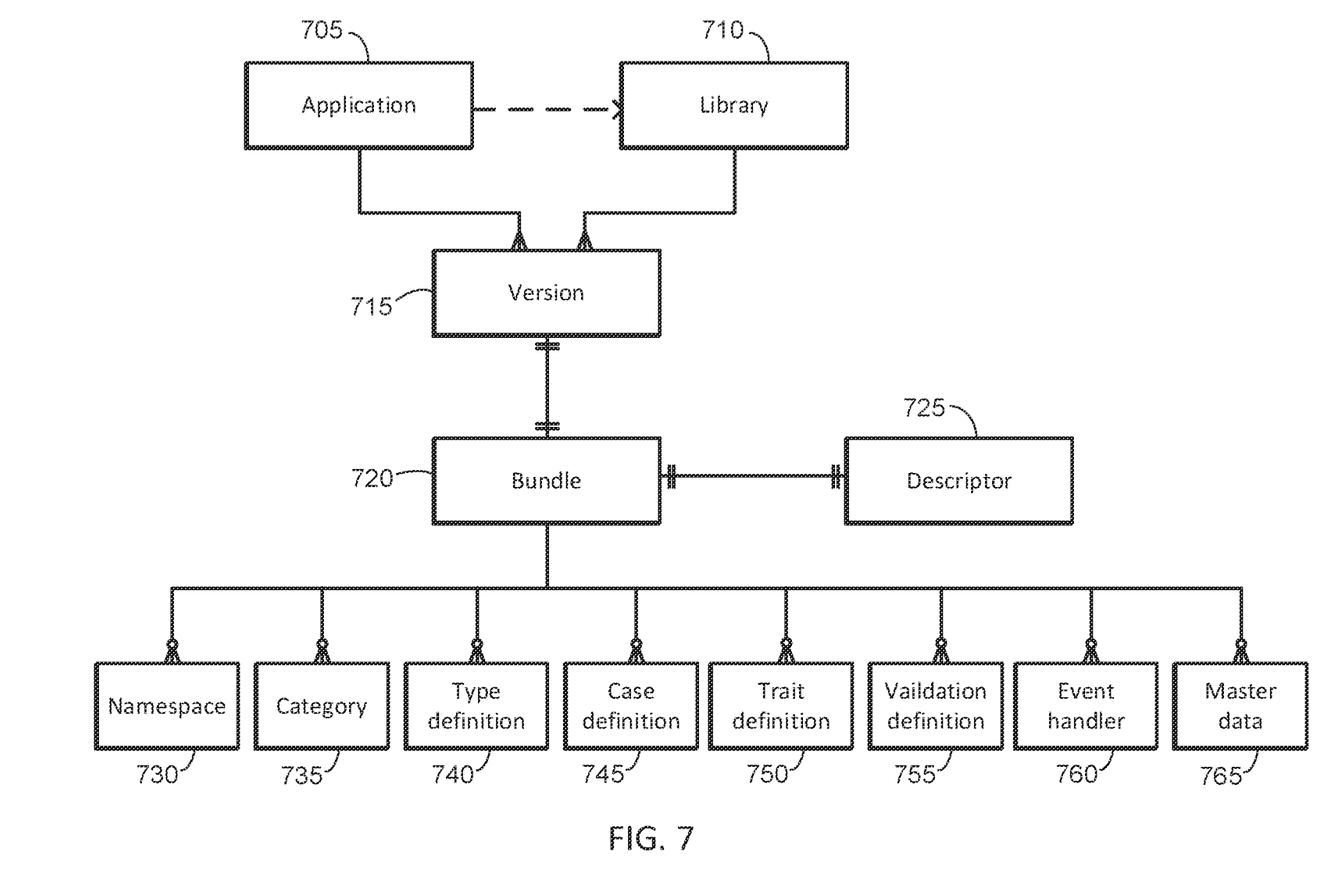

Referring to FIG. 7, the structure of a metadata bundle is illustrated. In this figure, an application 705 is registered in a library 710. Application 705 may have one or more versions 715, each of which is also registered in library 710. Each version of the application has a corresponding metadata bundle 720. An application metadata bundle is the structure that enables the application definition artifacts to be described and organized as a single piece. Metadata bundle 720 has a descriptor 725 and a set of metadata artifacts 730-765. In this example, there are a number of different types of artifacts including namespace 730, category 735, type definition 740, case definition 745, trait definition 750, validation definition 755, event handler 760 and master data 765. For each of these artifact types, the bundle may contain multiple artifacts, or it may contain none at all.

In one embodiment, the artifacts and the deployment descriptor in the metadata bundle are JSON (JavaScript Object Notation) files. These files can be stored, for example, in a folder hierarchy. It is possible for some of the artifacts to include other artifacts using JSON references and thereby re-use the other artifacts. The entire metadata bundle may be packaged in a suitable format, such as a zip archive file.

The bundle descriptor captures the basic metadata associated with the bundle. This metadata includes an application name and a deployment descriptor. The application name is the name of the application with which the bundle is associated. The deployment descriptor is a collection or array of artifact descriptors that define the application. The bundle descriptor is a JSON file which serves as an entry to the application bundle. The deployment manager uses the bundle descriptor as a starting point to orchestrate the deployment or upgrade of an application. The application metadata bundle provides the flexibility to organize the artifacts in the bundle in a folder hierarchy. This provides the application developer with independence to organize the artifact descriptors as desired.

A sample bundle descriptor is as follows:

```
{
    "applicationName": "system_app",
    "name": "system-2.0",
    "deployment": [
        {
            "action": "create",
            "type": "namespace",
            "value": {
                "prefix": "otexhr",
                "display_name": "OPEN Text HR",
                "descriptlion": "OTEXT HR Namespace",
                "name": "otexhr"
            }
        },
        {
            action": "create",
            "type": "namespace",
            "value": {
                "name": "person",
                "display_name": "Person",
                "namespace": "otexhr",
                "category": "object",
                "attributes": [
```

```
            {
                "name": "first_name",
                "display_name": "First Name",
                "data_type": "string",
                "size": 64,
                "validators": [
                    {
                        "type : length_validator",
                        "operation": "Create",
                        "params": [
                            {
                                "name": "min",
                                "value": "1"
                            }
                        ]
                    },
                    {
                        "type": "length_validator",
                        "operation": "Update",
                        "params": [
                            {
                                "name": "min",
                                "value": "1"
                            }
                        ]
                    },
```

This example is a simple inline structure, where are all the artifacts descriptors are included in single JSON file that embeds the all the required details. The bundle may alternatively use separate artifact descriptors. For simple bundles with smaller numbers of artifacts, an inline structure may be preferable. When there are larger numbers of artifacts that are defined in the context of an application, a reference or referential syntactic mode may be preferred. The reference mode enables artifact definitions to be reused and allows them to be better organized in an application bundle using nested folders. An example artifact descriptor using reference syntax is as follows:

```
{
    "action": "create",
    "type": "attributes",
    "parent":
    "@Reference(collection='metadata',type='type',locator='name='cms_trait_definition'')",
    "value": {
        "$ref": "1.0/sample-attributes/person_name.json"
}
```

The deployment descriptor captures the collection of the artifact descriptors associated with the metadata artifacts that are part of the application definition. The deployment descriptor is represented by a JSON array that contains the collection of artifact descriptors in the order in which they need to be installed in the context of the application.

The artifact descriptor defines the metadata artifact or seed data instance that is part of the application definition. It captures all the details required to instantiate an artifact or update an existing artifact as part of an application installation or upgrade. The artifact descriptor includes details shown in the Table 2 below.

TABLE 2

| Attribute | Description | Required | Possible Values |
|---|---|---|---|
| action | The action that need to be performed as part of artifact installation during application instantiation/upgrade | TRUE | create, update |
| type | The type of artifact | TRUE | namespace, category, type, trait, attribute, indexDefinition, requiredTrait, operation, instance, caseModel, acl |
| value | The actual artifact payload | TRUE | |
| parent | Refers to the parent entity bound to the artifact, used only in case of metadata artifacts (attribute, indexDefinition, requiredTrait, operation). The value of the parent entity is | FALSE | Sample expression bound to the parent will be as follows. The following expression location type definition with system name otexhr_person @Reference(collection='metadata', type='type',locator='name='otexhr_person") |

An example of an artifact descriptor is shown below:

```
{
    "action": "create",
    "type": "namespace",
    "value": {
        "prefix": "otexhr",
        "display_name": "OPEN Text HR",
        "description": "OTEXT HR Namespace",
        "name": "otexhr"
        {
            "action": "create",
            "type": "type",
            "value": {
                "name": "person",
                "display_name": "Person",
                "namespace": "otexhr",
                "category": "object",
                "attributes": [
                    {
                        "name": "first_name",
                        "display_name": "First Name",
                        "data_type": "string",
```

The artifact descriptor supports reference expressions for certain attributes, such as parent in the attribute descriptor and ID based attributes in such as acl_id, parent_folder_id, and id (In case of an instance update). The syntax of the reference expression is:

```
@Reference(collection='{collectionType}',
    type='{objectType}',
    locator='{locatorExpression}')
```

Reference expressions enable the application deployment orchestrator to look up dependent objects dynamically within the scope of the target tenant and to resolve them. It may be used extensively for attributes which require ID values, such as acl_id, parent_folder_if, etc., but not the value of ID for an object instance that is not fixed and changes from tenant to tenant.

Examples of reference expressions are as shown in Table 3 below.

TABLE 3

| Expression | Description |
|---|---|
| @Reference(collection='metadata',type='type',locator='name='otex_sample_type") | This expression locates a type definition by name otext_sample_type |
| @Reference(collection='metadata',type='trait',locator='name='otex_sample_trait") | This expression locates a trait definition by name otext_sample_trait |
| @Reference(collection='permissions',type='cms_acl',locator='name='default-acl") | This expression locates an ACL by name default-acl |
| @Reference(collection='permissions',type='cms_acl',locator='name like 'test%") | This expression locates an ACL whose name starts with string test |
| @Reference(collection='objects',type='cms_folder',locator='name='root") | This expression locates an object of type cms_folder with name root, which is essentially the root folder |

Various different types of artifacts may be supported. In one embodiment, the supported artifact types include: Namespace; Type Definition; trait Definition; attribute; index Definition; operation; required traits; case model; ACL; and object instance. These artifact types are briefly described below. Other types of artifacts may be supported in other embodiments.

Namespace. An example payload to create a name space is as given below. The value of the artifact type for name space should be "namespace". The payload for the namespace should be a valid payload as per the requirements enforced by the content management system.

Type Definition. An example payload to create a new type definition is as given below. A valid type definition creation payload needs to be specified for creation of new type definition.

Trait Definition. An example payload to create a new type definition is as given below, A valid trait definition creation payload needs to be specified for creation of a new trait definition.

```
{
    "action": "create",
    "type": "trait",
```

```
"value": {
    "name": "address",
    "display_name": "Address",
    "namespace": "otexhr",
    "attributes": [
        {
            "name": "street",
            "display_name":"Street",
            "data_type": "string",
            "size": 512,
```

Attribute. An example payload to create a new attribute is as given below. The reference expression associated with the parent attribute determines the respective type/trait with which this attribute needs to be associated. The same applies to other metadata artifacts, such as indexDefinition, operation and requiredTraits. The above sample adds a new attribute named middle_name to type definition named otexthr_person.

```
{
    "action":"create",
    "type":"attribute",
    "parent":"@Reference(collection='metadata',type='type',locator='name='otexhr_person")",
    "value":{
        "name": "middle_name",
        "display_name": "Middle Name",
        "data_type": "string",
        "repeating": false,
        "default_value": "Sample",
        "size": 128
    }
}
```

IndexDefinition. An example payload to create a new index definition is as given below. A valid index definition payload needs to be given to create new index definition. The example below creates a new index definition for columns first_name and last_name pertaining to type definition otexhr_person

```
{
    "action":"create",
    "type":"indexDefinition",
    "parent":"@Reference(collection='metadata',type='type',locator='name='otexhr_person")",
    "value":{
        "name": "last_name_first_index",
        "columns": {
            "first_name",
            "last_name"
        }
    }
}
```

Operation. An example payload to create a new operation is as given below. The operations are only associated with the type definitions, so valid value of type in reference expression should always be type.

```
{
    "action": "create",
    "type": "operation",
    "parent":
    "@Reference(collection='metadata',type='type',locator='name='otexhr1_person")",
```

```
"value": {
    "name": "sendRegistrationEmail",
    "display_name": "Send Registration Email Updated",
    "description": "Send RegistrationEmail Updated",
    "required_object_permits": [
        "WRITE",
        "BROWSE"
    ],
    "http_request_method": "PUT",
    "expect_type_instance_input": false,
    "expect_operation_data_input": true,
```

RequiredTraits. An example payload to create a new required trait is as given below. The required traits are only associated with the type definitions, so a valid value of type in the reference expression should always be trait.

```
{
    "action": "create",
    "type": "requiredTrait",
    "parent":
    "@Reference(collection='metadata',type='type',locator='name='otexhr1_person")",
    "value":{
        "instance_name": "person_information",
        "trait_name": "xecm_person_information"
    }
}
```

CaseModel: An example payload for creation of a new case model is as given below.

```
{
    "action": "create",
    "type": "caseModel",
    "value": {
        "name": "employee_case",
        "version_no": 1.0,
        "display_name": "xECM app Employee HR information",
        "description": "xECM app Employee HR information",
        "namespace": "xecm",
        "rootCaseNode": {
            "name": "employeeRoot",
```

ACL: An example payload for creation of a new permission/ACL is as given below.

```
{
    "action": "create",
    "type": "acl",
    "value": {
        "name": "admin_acl",
        "description": "ACL for public access",
        "owner": "world",
        "permits": [
            {
                "identity": "world",
                "identity_type": "role",
                "permissions": [
                    "browse",
                    "read_content",
                    "write"
                ]
            }
        ]
    }
}
```

Object Instance: An example payload for creation of a new object instance is as given below. Attributes of type ID, such as acl_id, and parent_folder_id can be resolved using the expressions as explained above with respect to reference expressions, and as shown in the following example.

```
{
   "action": "create",
   "type":"instance",
   "value":{
      "type":"otexhr_person",
      "category":"object",
      "name": "Pawel",
"parent_folder_id":"@Reference(collection='objects',type='cms_folder',locator='name='root')",
"acl_id":"@Reference(collection='permissions',type='cms_acl',locator='name='default-acl')",
      "properties": {
         "first_name": "Pawel",
         "last_name": "Zieminski",
```

Figure 8:
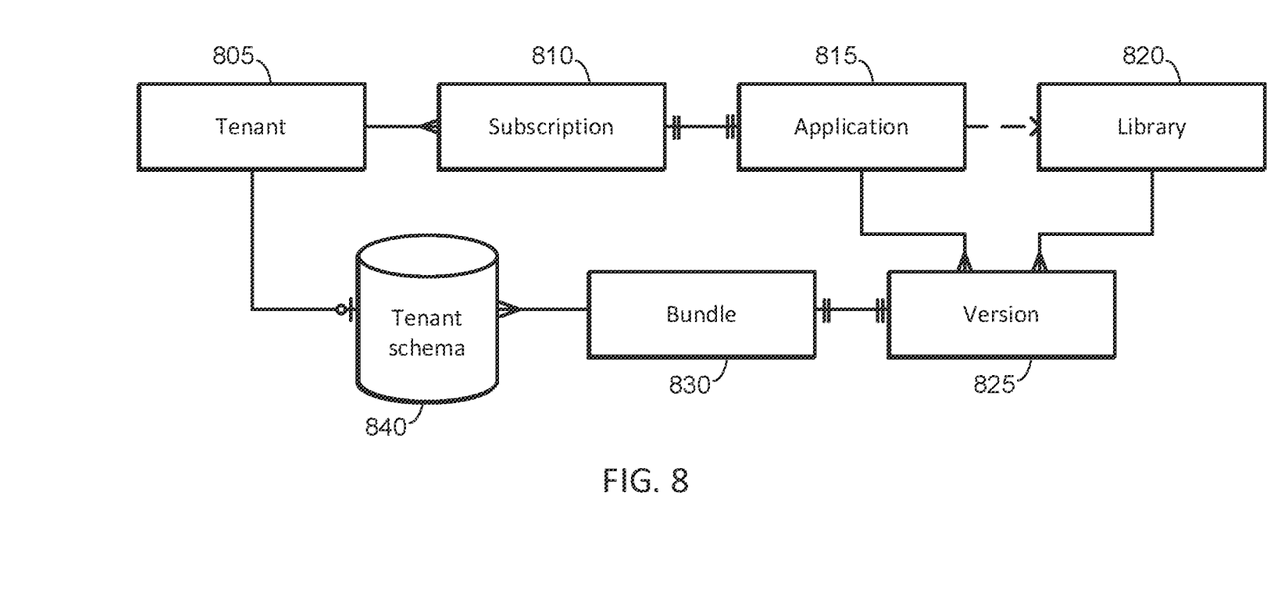

Referring to FIG. 8, a diagrammatic representation of the relationships associated with an installed application metadata bundle is shown. As depicted in this figure, a tenant 805 has one or more subscriptions 810. Each subscription 810 is associated with a corresponding one of the applications 815 that are available on the cloud-based multitenant platform. Each of the subscribed applications 815 is registered in a library 820. As described above, each application 815 may have one or more versions 825, each of which is stored in library 820. Each version 825 of the application has a corresponding metadata bundle 830 that is deployed with respect to tenant 805. Each bundle 830 may be deployed within one or more tenant schemas 840, one of which corresponds to tenant 805.

Figure 9:
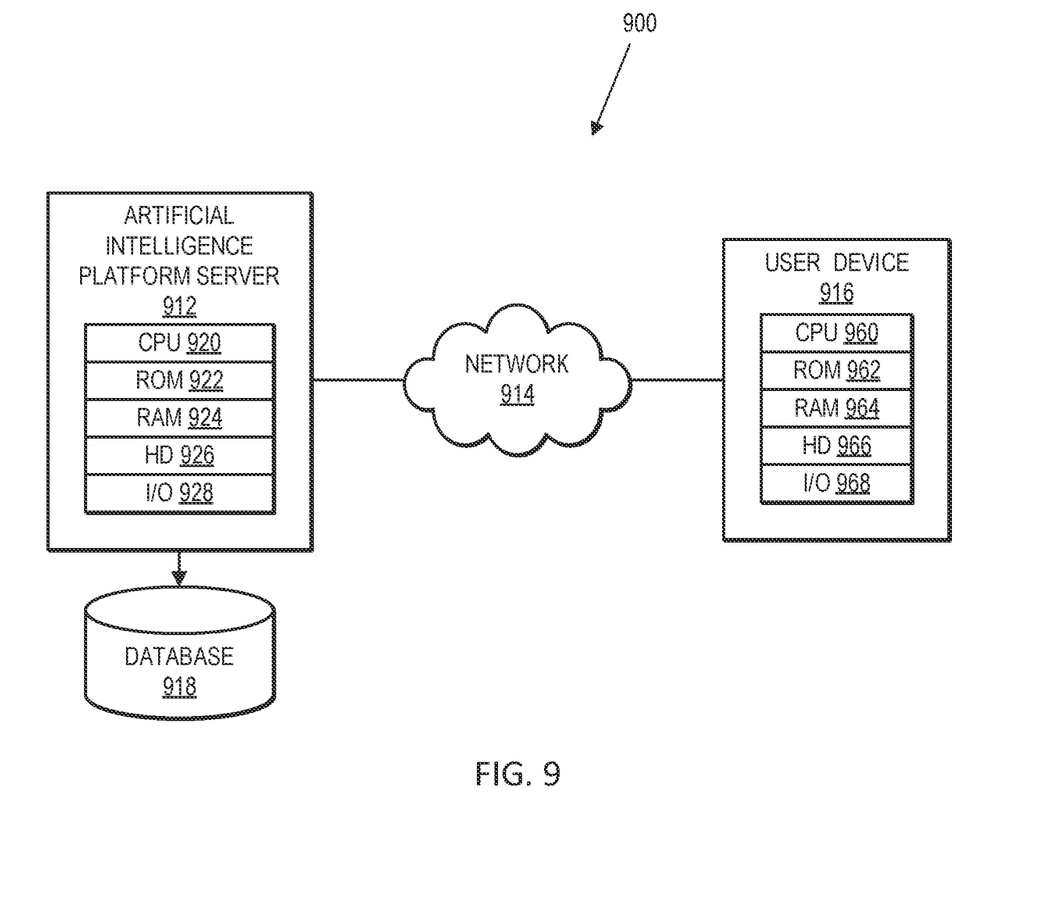

FIG. 9 depicts a diagrammatic representation of a distributed network computing environment where embodiments disclosed can be implemented. In the example illustrated, network computing environment 900 includes network 914 that can be bi-directionally coupled to a server computer 912 that executes the multitenant platform, and a user computer 916. Computer 912 can be bi-directionally coupled to data store 918. Network 914 may represent a combination of wired and wireless networks that network computing environment 900 may utilize for various types of network communications known to those skilled in the art.

For the purpose of illustration, a single system is shown for each of computer 912 and computer 916. However, with each of computer 912 and computer 916, a plurality of computers (not shown) may be interconnected to each other over network 914. Computers 916 may include data processing systems for communicating with computer 912. Computer 916 may include data processing systems for individuals whose jobs may require them to configure services used by computers 912 in network computing environment 900.

First computer 912 can include central processing unit ("CPU") 920, read-only memory ("ROM") 922, random access memory ("RAM") 924, hard drive ("HD") or storage memory 926, and input/output device(s) ("I/O") 928. I/O 928 can include a keyboard, monitor, printer, electronic pointing device (e.g., mouse, trackball, stylus, etc.), or the like. Computer 912 may include one or more backend systems configured for providing a variety of services to computers 912 over network 914. These services may utilize data stored in data store 918. Many other alternative configurations are possible and known to skilled artisans.

Likewise, computer 916 may include CPU 960, ROM 962, RAM 964, HD 966, and I/O 968. Computer 916 can include a desktop computer, a laptop computer, a personal digital assistant, a cellular phone, or nearly any device capable of communicating over a network. Computer 915 may be similar to computer 912 and can comprise CPU 950, ROM 952, RAM 954, HD 956, and I/O 958.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 912 and 916 is an example of a data processing system. ROM 922 and 962; RAM 924 and 964; HD 926 and 966; and data store 918 can include media that can be read by CPU 920 or 960. Therefore, these types of memories include non-transitory computer-readable storage media. These memories may be internal or external to computers 912 or 916.

Portions of the methods described herein may be implemented in suitable software code that may reside within ROM 922 or 962; RAM 924 or 964; or HD 926 or 966. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system that implements an object metadata service for managing application configuration in a multi-tenant environment, the system comprising:
one or more servers having one or more processors and one or more memories, the one or more processors being communicatively connected to one or more data storage devices;
an application manager implemented by the one or more processors of the one or more servers which:
for each of a plurality of different versions of an application which is common to multiple tenants, captures application metadata for the version of the application and generates a corresponding bundle which contains the metadata that defines the version of the application;
initiates validation of each of a plurality of different bundles, including validating each of the plurality of different bundles and thereafter storing the validated bundles in a bundle library in the one or more data storage devices; and
initiates deployment of a specific one of the versions of the application for a corresponding one of the multiple tenants of the multi-tenant environment by selecting and installing the specific version of the application including:
retrieving a master data schema and one of the validated bundles corresponding to the specific one of the versions of the application from the bundle library,
installing the retrieved master data schema and the retrieved bundle, and
generating a tenant data schema defining a tenant data model for the specific version of the application corresponding to the retrieved master data schema and the retrieved bundle, wherein the tenant data schema is accessible by the corresponding tenant of the multi-tenant environment.

2. The system of claim 1, wherein the application manager receives application information including the application metadata from a management system that is communicatively connected to the application manager and defines each of the bundles based on the application metadata.

3. The system of claim 2, wherein the application manager maintains an inventory of tenant subscriptions, wherein each of the subscriptions identifies a corresponding version of the application, wherein different tenant subscriptions are capable of identifying the different versions of the application, and wherein the different versions of the application are associated with different ones of the validated bundles stored in the bundle library.

4. The system of claim 1, wherein each bundle comprises a corresponding descriptor artifact and wherein the descriptor artifact comprises a JSON file that is stored in a hierarchical folder structure.

5. The system of claim 1, wherein each bundle comprises a compressed data structure.

6. The system of claim 1, wherein the application metadata bundle captured for the corresponding version of the application comprises a first application metadata bundle captured for a first version of the application, wherein the first application metadata bundle defines one or more dependencies on one or more additional application metadata bundles.

7. The system of claim 6, wherein the one or more additional application metadata bundles are installed according to a dependency graph defined in the first application metadata bundle prior to deploying the application metadata of the first application metadata bundle.

8. A method for execution of instructions by an application manager in a multitenant environment, the method comprising:
capturing application metadata for each of a plurality of different versions of an application which is common to multiple tenants of a multitenant computing platform;
generating a plurality of different application metadata bundles, wherein each application metadata bundle contains the application metadata that defines a corresponding one of the plurality of different versions of the application;
initiating validation of each of the plurality of different application metadata bundles, the bundle manager configured to store including storing the plurality of different validated application metadata bundles in a bundle library in one or more data storage devices;
initiating deployment of a specific version of the application, the deployment including:
retrieving a master data schema and at least one of the plurality of different bundles from the bundle library,
deploying the retrieved master data schema and the at least one retrieved bundle to the multitenant computing platform; and
generating a tenant data schema defining a tenant data model corresponding to the retrieved master data schema and the at least one retrieved bundle on the multitenant computing platform, wherein the tenant data schema is accessible by a corresponding one of the multiple tenants of the multitenant computing platform.

9. The method of claim 8, further comprising maintaining an inventory of tenant subscriptions, wherein each of the subscriptions identifies a corresponding version of the application, wherein different tenant subscriptions are capable of identifying different versions of the application, and wherein the different versions of the application are associated with different ones of the validated bundles stored in the bundle library.

10. The method of claim 8, wherein each bundle comprises a compressed data structure that contains a descriptor artifact that describes operations for deploying the corresponding version of the application and an operation payload which includes one or more metadata payload artifacts that define a configuration of the corresponding version of the application.

11. The method of claim 8, wherein an application metadata bundle generated for the corresponding version of the application comprises a first application metadata bundle captured for a first version of the application, wherein the first application metadata bundle defines one or more dependencies on one or more additional application metadata bundles, wherein the first version of the application is deployed by deploying the one or more additional application metadata bundles according to a dependency graph defined in the first application metadata bundle prior to deploying the application metadata of the first application metadata bundle.

12. A computer program product comprising a non-transitory computer-readable medium storing instructions translatable by one or more processors to perform:
   capturing application metadata for each of a plurality of different versions of an application which is common to multiple tenants of a multitenant computing platform;
   generating a plurality of different application metadata bundles, wherein each application metadata bundle contains the application metadata that defines a corresponding one of the plurality of different versions of the application;
   initiating validation of each of the plurality of different application metadata bundles, including storing after validating each of the plurality of different application metadata bundles, the plurality of different validated application metadata bundles in a bundle library in one or more data storage devices;
   initiating deployment of a specific version of the application, the deployment including:
      retrieving a master data schema and at least one of the plurality of different bundles from the bundle library,
      deploying the retrieved master data schema and the at least one retrieved bundle to the multitenant computing platform; and
      generating a tenant data schema defining a tenant data model corresponding to the retrieved master data schema and the at least one retrieved bundle on the multitenant computing platform, wherein the tenant data schema is accessible by a corresponding one of the multiple tenants of the multitenant computing platform.

13. The computer program product of claim 12, wherein the application manager is further to perform:
   maintaining an inventory of tenant subscriptions, wherein each of the subscriptions identifies a corresponding version of the application, wherein different tenant subscriptions are capable of identifying different versions of the application, and wherein the different versions of the application are associated with different ones of the validated bundles stored in the bundle library.

14. The computer program product of claim 12, wherein each bundle comprises a compressed data structure that contains a descriptor artifact that describes operations for deploying the corresponding version of the application and an operation payload which includes one or more metadata payload artifacts that define a configuration of the corresponding version of the application.

15. The computer program product of claim 12, wherein an application metadata bundle generated for the corresponding version of the application comprises a first application metadata bundle captured for a first version of the application, wherein the first application metadata bundle defines one or more dependencies on one or more additional application metadata bundles, wherein the first version of the application is deployed by deploying the one or more additional application metadata bundles according to a dependency graph defined in the first application metadata bundle prior to deploying the application metadata of the first application metadata bundle.

* * * * *